United States Patent Office 2,982,730
Patented May 2, 1961

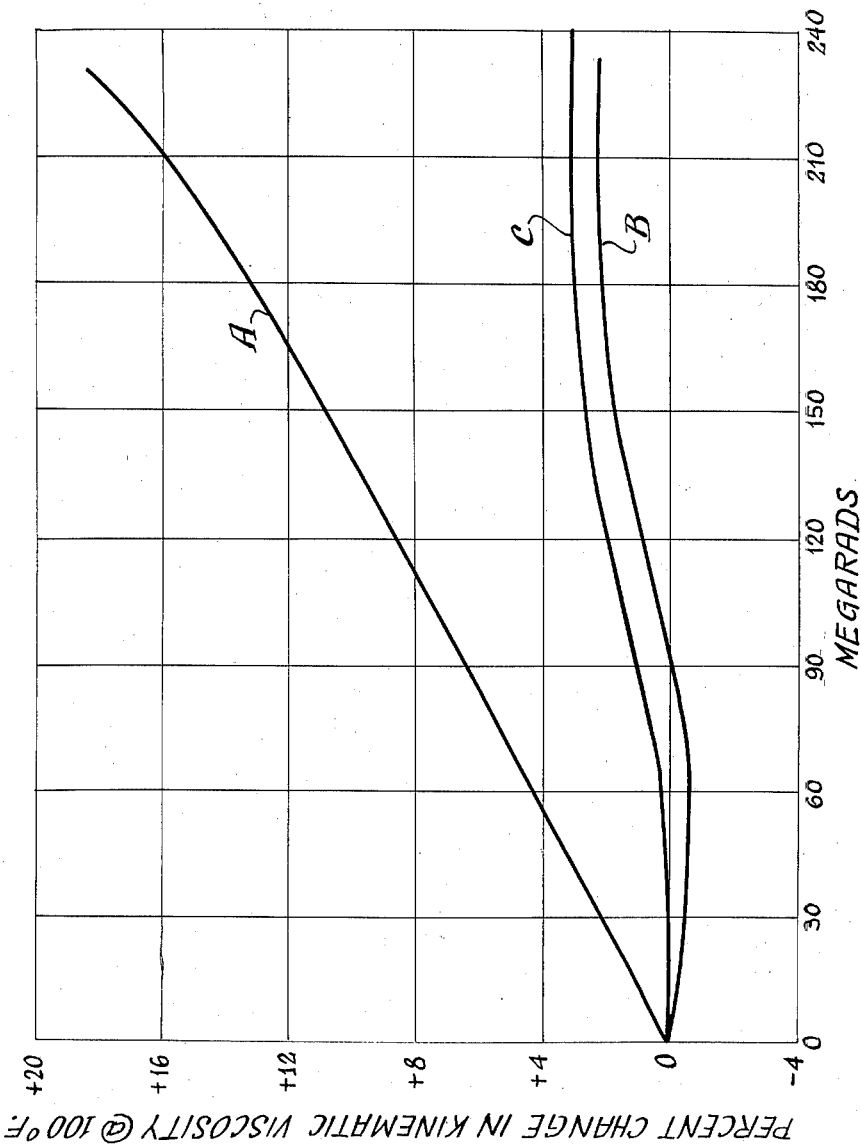

2,982,730
RADIATION RESISTANT LUBRICATING OIL
Edward G. Barry, Woodbury, N.J., assignor to Socony Mobil Oil Company, Inc., a corporation of New York
Filed May 3, 1957, Ser. No. 656,865
3 Claims. (Cl. 252—59)

This invention relates to the field of lubrication. It is more particularly concerned with the lubrication of machinery that is exposed to atomic radiation.

New and unusual problems are encountered in the lubrication of machinery that is exposed to radiation emitted from an atomic reactor or from atomic ordnance. Such radiation causes physical and chemical damage to the lubricating oil, because of ionization effects resulting from bombardment, such as from neutron and gamma ray bombardment. A most noticeable change that takes place in the oil is an increase in viscosity. Indeed, the increase becomes so marked that the lubricant is usually no longer suitable for its intended purpose.

It will be appreciated, therefore, that the aforedescribed deterioration in lubricating oil gives rise to operational problems. Thus, for example, proposed atomic power plants will require pumps, compressors, turbines, and the like, that will be exposed to radiation, at least to some extent. A method of lubrication that will resist the deleterious effects of radiation will be a necessity. Shielding, of course, may be effective to some extent, but stray radiations may still persist in sufficient intensity to present problems. Likewise, in the event of atomic warfare, machinery, such as military vehicles and guns, can be exposed to radiation. If the effects of radiation in the lubrication thereof are not controlled, such machinery would be in danger of becoming immobilized or, at least, having impaired operability.

It has now been found that the harmful effects of radiation on lubricating oils can be retarded simply and economically. It has been discovered that machinery can be operated in the presence of radiation, with retarded lubrication failure, by lubricating the relatively moving surfaces thereof with a lubricant that comprises mineral lubricating oil that contains certain polymers that contain benzene rings.

Accordingly, it is an object of this invention to retard the deterioration of lubricants that are exposed to atomic radiation. Another object is to reduce lubrication failure of machinery that is operated in the presence of radiation. A specific object is to provide a method for operating machinery in the presence of atomic radiation that comprises lubricating the relatively moving surfaces of said machinery with a lubricant comprising mineral lubricating oil containing certain benzene ring-containing polymers.

Other objects and advantages of this invention will become apparent from the following detailed description in conjunction with the drawing, which shows the graphic relationship between the dosage of radiation and the percent change in kinematic viscosity of a base mineral lubricating oil, of a typical lubricant utilizable in the present invention, and of isopropyl diphenyl.

In general, the present invention provides a method of operating machinery that is exposed to atomic radiation, which comprises lubricating the relatively moving parts of said machinery with a mineral lubricating oil containing a small amount, sufficient to substantially prevent viscosity increase thereof under the influence of atomic radiation, of an oil-soluble benzene ring-containing polymer.

In this specification the amount of radiation that is absorbed by a lubricant is measured in "rad" or "megarad" (1,000,000 rads). A rad is defined as the amount of radiation that will deposit 100 ergs per gram of substance bombarded. The units are used to measure the quantum of radiation absorbed from bombardment by any particle, i.e., electrons, neutrons, gamma rays, and beta rays.

The mineral lubricating oils contemplated for the lubrication of machinery exposed to atomic radiation are any petroleum hydrocarbon fractions ordinarily used for lubrication. Accordingly, there are contemplated gear oils, motor oils, pump oils, turbine oils, and the like. These oils can be petroleum fractions that have been subjected to one or more of the usual treatments applied to lubricating oil production, such as dewaxing, solvent extraction, acid extraction, and mild hydrogenation. The lubricating oil, dependent upon its use, will have a kinematic viscosity falling within the range varying between about 32 centistokes and about 600 centistokes measured at 100° F. The lubricant can also contain other materials adapted to impart specific properties thereto, such as E.P. agents, antirust additives, antioxidants, etc.

As mentioned hereinbefore, the lubricant used to lubricate machinery operated in the presence of atomic radiation contains a minor amount of an oil-soluble polymer that contains benzene rings. In general, these polymers are chain polymers having benzene rings attached to at least some of the carbon atoms in the chain. Preferably, the oil-soluble polymer is a hydrocarbon polymer. It can, however, contain atoms other than carbon and hydrogen, such as oxygen and nitrogen. Thus the polymer can be oil-soluble polymers, such as polyesters, polyamides, and low molecular weight phenol-aldehyde condensation products, although they are not all necessarily equivalent in their ability to stabilize oils against radiation effects. In the preferred form, the oil-soluble polymers can be alkylated styrene polymers, or copolymers of styrene or alkyl-substituted styrene with one or more olefinic hydrocarbons, such as butadiene, propylene, ethylene, butylene and the like. In general, the molecular weight of the polymers will vary between about 20,000 and about 100,000 and, preferably between about 50,000 and about 100,000. An especially preferred type of polymer is polystyrene that has been alkylated to contain an average of at least one alkyl radical for each styrene unit of the polymer, and, preferably, an average of two to three alkyl radicals per styrene unit. The polystyrene can be alkylated by any of the usual methods for alkylating aromatic rings, such as by use of olefins or of alkyl halides in the presence of catalysts, such as Friedel-Crafts catalysts. Usually the reaction is carried out in a suitable solvent, such as nitrobenzene, chlorobenzene, o-dichlorobenzene, ethyl dichloride, etc. The alkyl groups can be straight-chain, but a branched-chain structure is preferred. Generally, the alkyl group will contain between about 3 and about 16 carbon atoms, preferably, between about 3 and about 12 carbon atoms. Nonlimiting examples thereof are propyl, isopropyl, butyl, isobutyl, amyl, diisopropyl, diisobutyl, octyl, decyl, triisopropyl, triisobutyl, and tetraisobutyl.

A relatively small amount of polymer as aforedescribed is necessary in the lubricant to render it operable in the presence of atomic radiation. Generally, between about 0.2 percent and about 1.2 percent, by weight of the finished lubricant, is sufficient. Preferably, between about 0.5 weight percent and about 1 weight percent is used.

The stability of lubricants to radiation was determined by exposing samples to high energy electron bombardment and noting the change of viscosity with increased dosage. Kinematic viscosities were measured in accordance with ASTM procedure D445–53T. The following examples illustrate the effect of radiation on a lubricant and a method for minimizing the effect in accordance with the present invention.

EXAMPLE 1

The oil used in the runs of this example was a solvent refined paraffinic neutral oil having a Saybolt viscosity of 150 seconds at 100° F. This is a typical light turbine oil. Three portions of this oil were exposed to a high energy electron beam from a 2 mev. (million electron volts) Van de Graaff accelerator adjusted to give each oil 2.28 megarads of radiation per pass, at an exposure time of 9 seconds per pass. Each oil portion was exposed to radiation for a different number of passes, namely, 30, 60 and 100 passes. Thus, the portions were subjected to total radiation of, respectively, 68.5 megarads, 137 megarads, and 228 megarads. The kinematic viscosities at 100° F. and at 210° F. were determined for each portion of oil. The viscosities were compared with that of the original oil and the percent increase in viscosity over the original was calculated in each case. These percentages are set forth in Table I.

EXAMPLE 2

To another batch of the lubricating oil described in Example 1 was added 0.9 percent, by weight, of polystyrene of 75,000 molecular weight alkylated with nonylene (triisopropylene) and having an average of one nonyl group per styrene group. Three portions of this lubricant blend were subjected to varying dosages of radiation, exactly as described for the three samples in Example 1. Viscosities were determined for the unexposed blend and for each of the three portions after exposure. The viscosities of each portion were compared with the unexposed blend and the percent increase (or decrease) in viscosity over the unexposed blend was calculated in each case. These data are set forth in Table I.

Isopropyl diphenyl is known to be resistant to intense radiation and is utilizables as a coolant in atomic reactors. Accordingly, the behavior of this substance in the presence of radiation establishes a norm for purposes of comparison.

EXAMPLE 3

For comparison purposes, three portions of isopropyl diphenyl were subjected to varying dosages of radiation, exactly as was done in Example 1. The kinematic viscosity at 100° F. of the original material and of the irradiated material was determined. The percent increase of viscosity over that of the unexposed sample was calculated in each case. The data are set forth in Table I.

*Table I*

| Example | None | 68.5 megarads | 137 megarads | 275 megarads |
| --- | --- | --- | --- | --- |
| Example 1: | | | | |
| Percent KV change at 100° F | 0 | +5.9 | +9.2 | +18 |
| Percent KV change at 210° F | 0 | +4.1 | +6.9 | +12 |
| Example 2: | | | | |
| Percent KV change at 100° F | 0 | −0.55 | +1.5 | +2.4 |
| Percent KV change at 210° F | 0 | −3.5 | −2.9 | −1.4 |
| Example 3: | | | | |
| Percent KV change at 100° F | 0 | +0.43 | +2.56 | +3.2 |
| Percent KV change at 210° F | 0 | nil | nil | +1.4 |

It will be apparent from the data set forth in Table I that the lubricant of Example 2 is highly resistant to radiation. The curves in the drawings are based upon the data in Table I and present the graphic relationship between the percent increase or decrease, i.e., the percent change, in kinematic viscosity at 100° F. under radiation and the dosage of radiation for the base mineral lubricating oil (curve A), for a typical lubricant utilizable in the present invention (curve B), and for isopropyl diphenyl (curve C). It will be noted that the base oil (curve A) undergoes an increase in viscosity at a relatively rapid rate, whereas a lubricant utilizable in this invention (curve B) is relatively stable. The latter lubricant is to be compared with isopropyl diphenyl. Such comparison reveals that a lubricant utilizable herein closely approximates, or is even slightly better than, isopropyl diphenyl in its ability to resist damage from radiation. As isopropyl diphenyl will resist even the intense radiation encountered in an atomic reactor itself, it will be at once apparent that the inhibited lubricant contemplated in this invention can be used to lubricate machinery exposed to atomic radiation, without failure attributable to radiation damage.

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:

1. A method of operating machinery that is exposed to atomic radiation, which comprises lubricating the relatively moving parts of said machinery with a mineral lubricating oil containing between about 0.2 percent and about 1.2 percent, by weight of the lubricant, of an alkylated polystyrene having a molecular weight of between about 20,000 and about 100,000.

2. A method of operating machinery that is exposed to atomic radiation, which comprises lubricating the relatively moving parts of said machinery with a mineral lubricating oil containing between about 0.5 percent and about 1 percent, by weight of the lubricant, of a nonyl alkylated polystyrene having a molecular weight of between about 50,000 and about 100,000 and containing an average of 1 to 3 alkyl groups per styrene group.

3. A method of operating machinery that is exposed to atomic radiation, which comprises lubricating the relatively moving parts of said machinery with a mineral lubricating oil containing between about 0.5 percent and about 1 percent, by weight of the lubricant, of a nonyl alkylated polystyrene having a molecular weight of about 75,000 and containing an average of one alkyl group per styrene group.

References Cited in the file of this patent

UNITED STATES PATENTS

| | | |
| --- | --- | --- |
| 2,572,558 | Butler | Oct. 23, 1951 |
| 2,614,080 | Welch | Oct. 14, 1952 |
| 2,651,628 | Welch | Sept. 8, 1953 |
| 2,661,335 | Butler | Dec. 1, 1953 |